United States Patent
Habermehl et al.

(10) Patent No.: US 11,029,289 B2
(45) Date of Patent: Jun. 8, 2021

(54) ULTRASONIC TFM WITH CALCULATED ANGLE BEAMS

(71) Applicant: OLYMPUS AMERICA INC., Center Valley, PA (US)

(72) Inventors: Jason Habermehl, Quebec (CA); Benoit Lepage, Quebec (CA)

(73) Assignee: Olympus America Inc., Center Valley, PA (US)

( * ) Notice: Subject to any disclaimer, the term of this patent is extended or adjusted under 35 U.S.C. 154(b) by 557 days.

(21) Appl. No.: 15/849,195

(22) Filed: Dec. 20, 2017

(65) Prior Publication Data

US 2018/0180578 A1 Jun. 28, 2018

Related U.S. Application Data

(60) Provisional application No. 62/437,761, filed on Dec. 22, 2016.

(51) Int. Cl.
| | |
|---|---|
| *G01N 29/07* | (2006.01) |
| *G01N 29/44* | (2006.01) |
| *G01N 29/34* | (2006.01) |
| *G01N 29/06* | (2006.01) |

(52) U.S. Cl.
CPC ..... *G01N 29/4454* (2013.01); *G01N 29/0645* (2013.01); *G01N 29/07* (2013.01); *G01N 29/343* (2013.01); *G01N 2291/056* (2013.01); *G01N 2291/106* (2013.01)

(58) Field of Classification Search
CPC .......................... G01N 29/0645; G01N 29/4454
See application file for complete search history.

(56) References Cited

U.S. PATENT DOCUMENTS

| | | | |
|---|---|---|---|
| 2010/0106431 A1* | 4/2010 | Baba | G01N 29/07 702/39 |
| 2014/0238136 A1 | 8/2014 | Ten Grotenhuis et al. | |
| 2015/0023136 A1 | 1/2015 | Bredif et al. | |
| 2016/0109411 A1 | 4/2016 | Pellegrino et al. | |
| 2016/0258904 A1 | 9/2016 | Lozev et al. | |

(Continued)

OTHER PUBLICATIONS

Van Pamel, Anton. "Ultrasonic inspection of highly scattering materials." Ph. D. Dissertation, Imperial College of London (2015). (Year: 2015).*

(Continued)

*Primary Examiner* — Herbert K Roberts
(74) *Attorney, Agent, or Firm* — Schwegman Lundberg & Woessner, P.A.

(57) ABSTRACT

Disclosed is an apparatus and method for TFM post-processing of a FMC or HMC matrix acquired with an ultrasonic array probe. Post-processing is performed by calculating TFM beam forming amplitudes using round-trip delays to a focal point lying at depth d on a line at angle θ within the test object. Based on the beam forming amplitudes over a range of values of d within the imaging volume, a calculated A-scan is derived, which is equivalent to the response A-scan produced in conventional phased array imaging, but has the advantage of being focused at all points along the line. By post-calculation of calculated A-scans over a range of angles θ within the imaging volume, an imaging method is derived which is readily adapted to existing codes based on conventional A-scan imaging.

19 Claims, 5 Drawing Sheets

(56) References Cited

U.S. PATENT DOCUMENTS

2017/0269040 A1* 9/2017 Masuda .............. G01S 7/52047
2018/0372688 A1* 12/2018 Stoppiglia ............ G01N 29/043

OTHER PUBLICATIONS

University of Strathclyde Glasgow—Strathprints Institutional Repository—Total Focusing Method for Volumetric Imaging in Immersion Non-Destructive Evaluation, by Andrew Tweedie, Richard O'Leary, Gerald Harvey and Anthony Gachagan, Caroline Holmes, Paul D. Wilcox and Bruce Drinkwater, 2007 IEEE International Ultrasonics Symposium, published in New York, 5 pages.
University of Manchester—Advanced Ultrasonic Digital Imaging and Signal Processing for Applications in the Filed of Non-Destructive Testing, 2011 Thesis submitted by Miles Weston for the degree of Doctor of Engineering, 167 pages.
The Wavenumber Algorithm for Full-Matrix Imaging Using an Ultrasonic Array, Alan J. Hunter, Bruce W. Drinkwater and Paul D, Wilcox, IEEE Transactions on Ultrasonics, Ferroelectrics, and Frequency Control, vol. 55, No. 11, Nov. 2008, 13 pages.
19th World Conference on Non-Destructive Testing 2016—High Resolution Phased Array Imaging Using the Total Focusing Method, Wolfram A. Karl Deutsch, Werner Roye, Helge Rast, Phillippe Benoist, 8 pages.

* cited by examiner

ULTRASONIC TFM WITH CALCULATED ANGLE BEAMS

CROSS REFERENCE TO RELATED APPLICATIONS

This application claims the benefit and priority of U.S. Provisional patent application Ser. No. 62/437,761 filed Dec. 22, 2017 entitled AN IMPROVEMENT TO ULTRASONIC TFM WITH CALCULATED ANGLE BEAMS, the entire disclosure of which is incorporated herein by reference.

FIELD OF THE INVENTION

The present invention relates to ultrasonic non-destructive testing (NDT) and more particularly to an improved method of Total Focusing Method (TFM), in which A-scans of fixed angle beams are generated in post-processing at desired angles.

BACKGROUND OF THE INVENTION

In a typical existing full matrix capture (FMC) acquisition, a plurality of pulser elements of one or more ultrasonic array probes are individually pulsed and response A-scan data is received for each pulse at each of a plurality of receiver elements, wherein the response A-scan data for each receiver element is a graph of received ultrasound amplitude as a function of time-of-flight. The result of the acquisition is an M×N matrix of response A-scans, where N is the number of pulsers and M is the number of receivers. The existing FMC acquisition method enables full beam forming capabilities in post-processing for both emission and reception. Of all the possibilities enabled by FMC, one of the most promising aspects is the ability to provide optimized focusing at all of the imaging plane positions. This is referred to as Total Focusing Method (TFM).

In existing practice, TFM is applied by dividing the imaging volume into an array of voxels, and summing the response A-scans from the FMC matrix, with delays appropriate to the time of flight from each pulser via each voxel to each receiver. The term "voxel" is used herein to denote an elementary volume within the imaging volume, analogous to the term "pixel" as applied to two-dimensional images.

An important disadvantage of the voxel approach in existing practice is that the notion of a propagation direction of the ultrasonic waves is not accounted for in the voxels' definition. The concept of direction of propagation is important in non-destructive testing (NDT) because it strongly impacts the interaction between flaws and an interrogating ultrasonic beam. Accordingly, it is a key component of the scan plan which forms the basis for compliance with NDT inspection codes such as "ASME Boiler and pressure vessels—section V: Non-destructive evaluation". Note that such codes are all directed to conventional phased array ultrasound (PAUT) imaging, and specifically to A-scans along particular directions. No such A-scans are available with the voxel approach, and consequently, it is difficult to integrate the voxel method into existing NDT protocols while ensuring compliance with existing codes.

A further disadvantage of the voxel approach is that, in general, highest acoustic resolution is desired along the direction of an A-scan, with lower resolution being sufficient in transverse directions. Such matching of resolution to the propagation mode is not possible with the voxel approach which lacks directionality. Therefore there will either be insufficient resolution in some directions, or excessive computing resources required to achieve high resolution throughout the imaging volume.

A further disadvantage of the voxel approach is that the voxel array may extend to regions of the imaging volume which are not acoustically viable, and consequently TFM processing power may be wasted in performing image calculations for these regions. The results of attempting to image such non-viable volumes may be misleading to the user.

There therefore exists a need for a TFM solution which restores angular information, includes a direction of propagation and computes calculated A-scans for such directions. Such a TFM solution would ensure seamless compliance with existing NDT codes and would also make better use of available computing resources.

SUMMARY OF THE INVENTION

Accordingly, it is a general objective of the present disclosure to provide an improved TFM solution which computes angular information in post-processing, including a direction of propagation, and computes calculated A-scans for such directions.

It is further an objective of the present disclosure to ensure seamless compliance with existing NDT codes.

It is further an objective of the present disclosure to improve the utilization efficiency of available computing resources.

These objectives are achieved by providing an apparatus and method which allows summation of FMC response A-scans along fixed angular directions, thereby providing a calculated A-scan for a range of angles within the imaging volume. The summation allows the calculated A-scan to be focused at each point along a line at each angle.

DETAILED DESCRIPTION OF PREFERRED EMBODIMENT

The TFM analysis apparatus and method of the present disclosure may be applied to various NDT inspection modes using one or more ultrasonic array probes. In a preferred embodiment, the method is applied in pulse-echo (PE) mode with a single probe. However, those skilled in the art may devise applications of the present apparatus and method to other inspection modes, and all such applications are within the scope of the present disclosure.

Figure 1A:
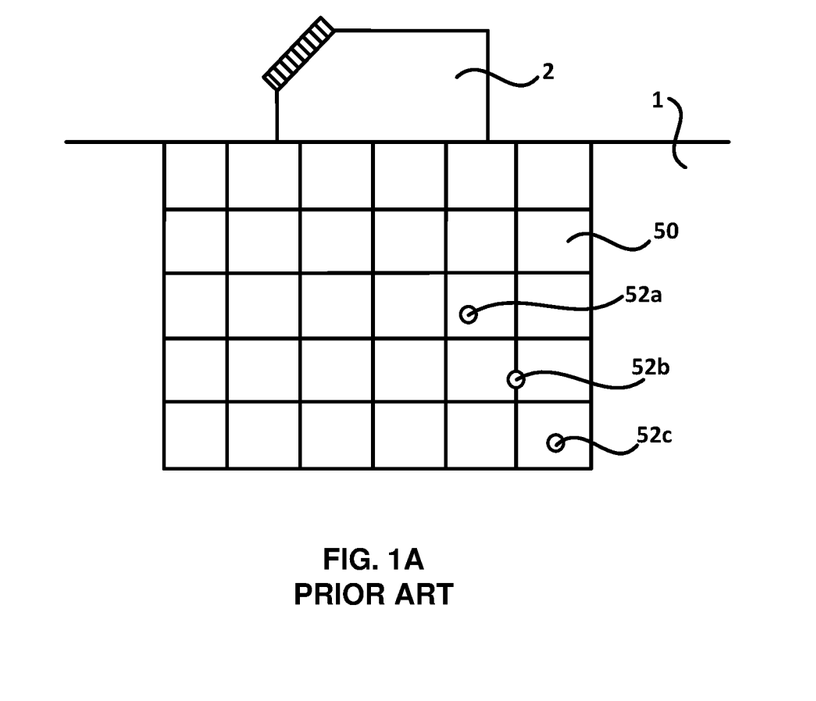
FIG. 1A is a schematic diagram of a prior art TFM method using the voxel approach.

FIG. 1A is a schematic diagram of a prior art TFM method using the voxel approach. A probe 2 is in acoustic contact with a test object 1. After acquisition of the FMC matrix, TFM post-processing is performed over a regular array of voxels 50, with delays in the TFM summation being the time of flight from each transmitter on probe 2 to each voxel and back to each receiver on probe 2. Note that the voxels are represented by a regular array with no angular definition. Note also that flaws 52a, 52b and 52c are detected without angular relationship.

Figure 1B:
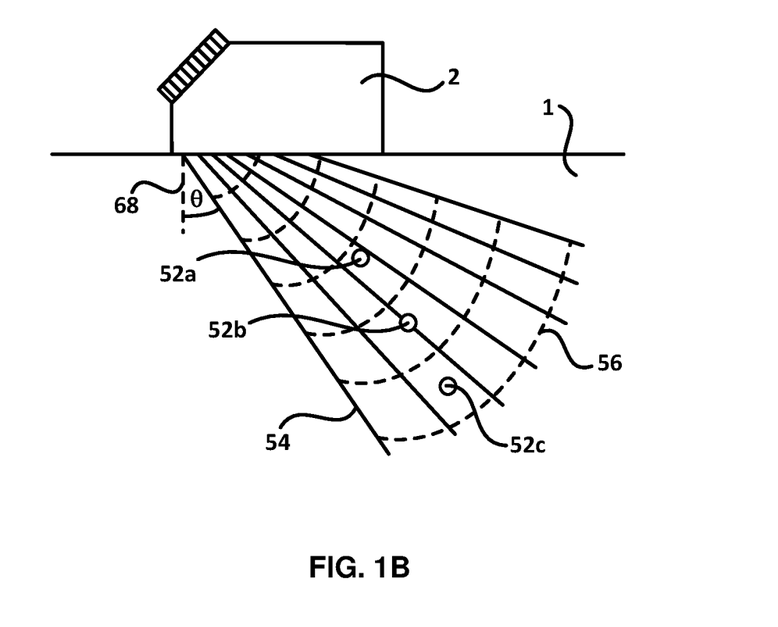
FIG. 1B is a schematic diagram of a TFM method according to the present disclosure.

FIG. 1B shows a TFM method according to the present disclosure. After acquisition of the FMC matrix, post-processing is performed by generating calculated A-scans along a series of lines 54, each line 54 having a different angle θ relative to a reference direction 68 normal to the surface of test object 1. Lines 54 are directly analogous to propagating beams generated in regular PAUT imaging. Note that flaws 52a, 52b and 52c are detected with reference to a particular angle θ of one of lines 54, and a distance along that line represented by arcs 56.

Figure 2A:
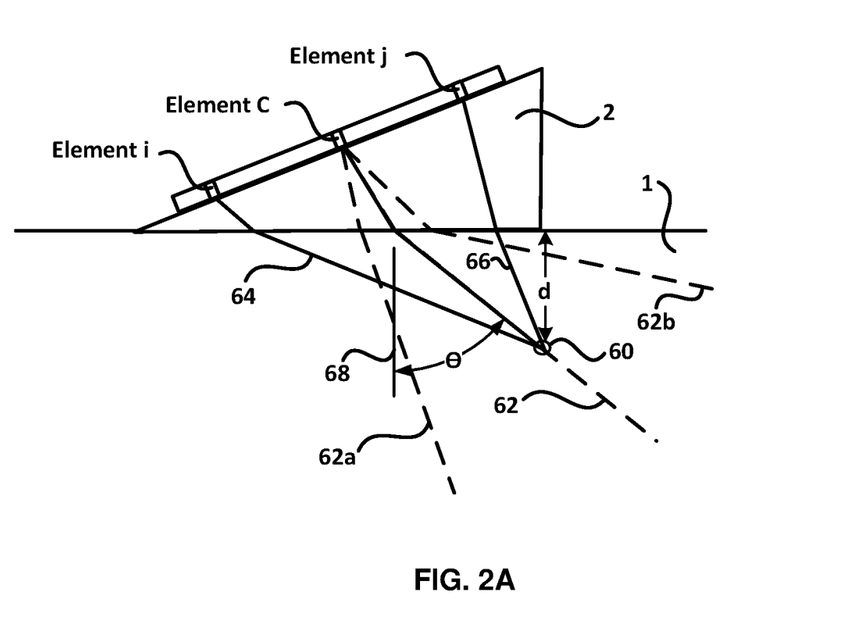
FIG. 2A is an illustration of variables for calculating delays at a focal point in post-processing according to the present disclosure.

FIG. 2A is an illustration of variables for calculating delays in post-processing according to the present disclosure. A probe 2 is in acoustic contact with a test object 1. After acquisition of the FMC matrix, TFM post-processing is performed over a regular array of voxels 60, with delays in the TFM summation being the time of flight from each transmitter on probe 2 to each voxel and back to each receiver on probe 2. Ultrasonic array probe 2 has N elements, of which element C is the center element of the instrument aperture. Prior to the post-processing calculations, an FMC matrix $A_{ij}$ is acquired, wherein $A_{ij}$ is the response A-scan data corresponding to transmission from an element i and reception at an element j. For PE mode using the full probe aperture, there are N transmitters and N receivers, so that i=1 to N and j=1 to N.

TFM is defined as focusing of the FMC array at every point in the test piece in order to form the image. In the TFM of the present disclosure, the focus is at a focal point 60 located at a depth d and lying on a line 62 which makes an angle θ relative to reference normal 68. Note that emission from element C occurs within a range of angles from a minimum angle represented by a line 62a to a maximum angle represented by a line 62b. Emission and reception from all other elements of probe 2 also occurs over similar angular ranges (not shown). Therefore angle θ may be selected from a range of angles, and line 62 represents only one such choice.

As part of the novel aspects, the TFM delay calculation necessary to achieve focus at focal point 60 proceeds as follows:

Knowing the target angle θ, the beam exit point is calculated based on Snell's law (assuming the summed beam is emitted by element N/2).

The position of focal point 60 in the x, y space is deduced. A round trip time $\tau_{ij}$ for the acoustic pulse to travel from element i to element j via focal point 60 is calculated using the Fermat principle, according to which the minimum possible time for a pulse to travel from element i to focal point 60 is found and added to the minimum time for a pulse to travel from element j to focal point 60.

The round trip time calculation is repeated for all transmitter and receiver elements of probe 2, namely for i=1 to N and j=1 to N.

Having calculated all delays $\tau_{ij}$, the TFM calculated A-scan beam forming amplitude at focal point 60 is calculated as:

$$TFM(d, \theta) = \sum_{j=1}^{M} \sum_{i=1}^{N} A_{ij}(\tau_{ij}(d, \theta)) \quad (1)$$

where TFM(d,θ) is the calculated A-scan beam forming amplitude at focal point 60, represented by depth d and angle θ, and $A_{ij}$ are the response A-scans of the FMC matrix.

Figure 2B:
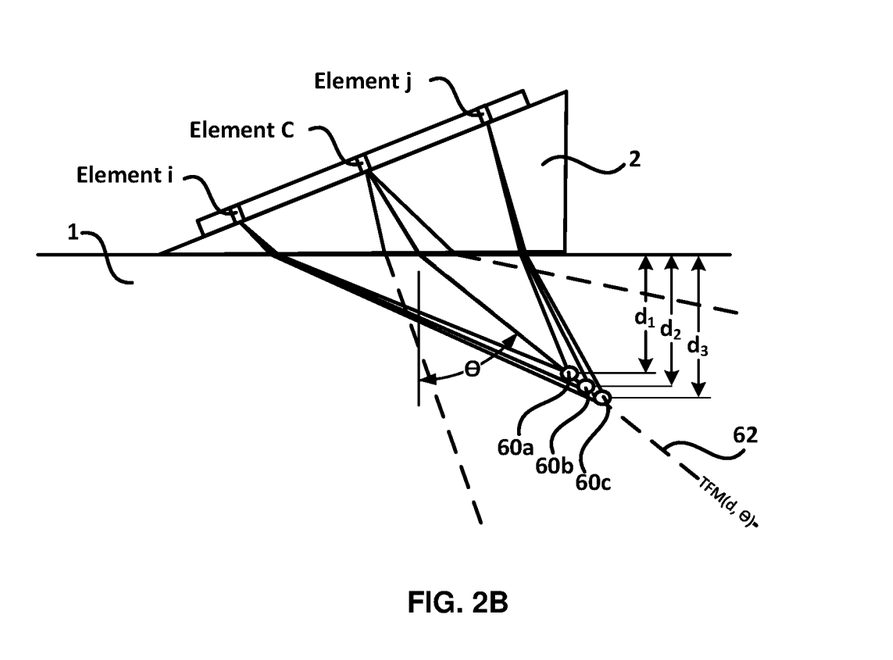
FIG. 2B is an illustration of variables for calculating delays at a series of focal points along a line in post-processing according to the present disclosure.

FIG. 2B schematically shows extension of the concept of TFM focusing at a single point 60 to focusing all along a line 62. FIG. 2B shows three exemplary focal points 60a, 60b and 60c, all lying on line 62 at angle θ, and having depths $d_1$, $d_2$ and $d_3$ respectively. Round trip times $\tau_{1ij}$, $\tau_{2ij}$ and $\tau_{3ij}$ are calculated from element i to focal points 60a, 60b and 60c respectively, and back to element j. A complete calculated A-scan at angle θ may then be generated by summing the TFM amplitudes at each of focal points 60a, 60b and 60c and every other point along line 62 for which the TFM calculated A-scan is to be formed:

$$A\text{-scan}(\theta) = [\ldots \text{TFM}(d_1,\theta), \text{TFM}(d_2,\theta), \text{TFM}(d_3,\theta), \ldots] \quad (2)$$

where the function includes values of d representative of the whole length of line 62 within the imaging volume. Equation (2) represents building a calculated A-scan as a collection of TFM amplitudes at different depths. Since the depths correspond to different times-of-flight, the resulting function A-scan (θ) has the characteristics of amplitude vs time-of-flight in direct analogy to a conventional PAUT response A-scan.

Equation (2) represents formation of a PE TFM calculated A-scan with angle θ. Note that this calculated A-scan is analogous to the response A-scan produced by a regular PAUT beam, with one important difference: a regular PAUT beam may be focused at only one point along the line, whereas the TFM calculated A-scan is focused at all points on the line. Therefore the imaging resolution of the TFM calculated A-scan is superior to the imaging resolution of the regular PAUT response A-scan, and this is a major advantage of the present disclosure.

Note also that equation (2) enables generation of a calculated TFM sectorial scan by repeating the post-processing calculations for a range of values of θ, corresponding to the desired angular range of the sectorial scan. Optionally, the calculated A-scan, Ascan(θ), may be digitally processed, for example by using a high pass filter, prior to formation of the sectorial scan image.

Note also that production of a TFM calculated A-scan according to the present disclosure, may also be applied to correspond to other types of conventional PAUT imaging. For example, TFM calculated A-scans may be generated to correspond to a PAUT linear scan in which the beam is laterally scanned, but remains at a fixed angle. In this case, the angle parameter θ in equations (1) and (2) is replaced by a displacement parameter L, while parameter d would continue to represent the depth. All such extensions of TFM calculated A-scan generation to correspond to other types of PAUT are within the scope of the present disclosure.

It should be noted that one of the most important novel aspects of the present disclosure is that the calculated A-scan at angle θ or the angle beam at angle θ is calculated during post-processing. Unlike conventional phased array imaging, it is not an actual angle beam which is physically focused by operation of ultrasonic phased array focal laws.

Figure 3A:
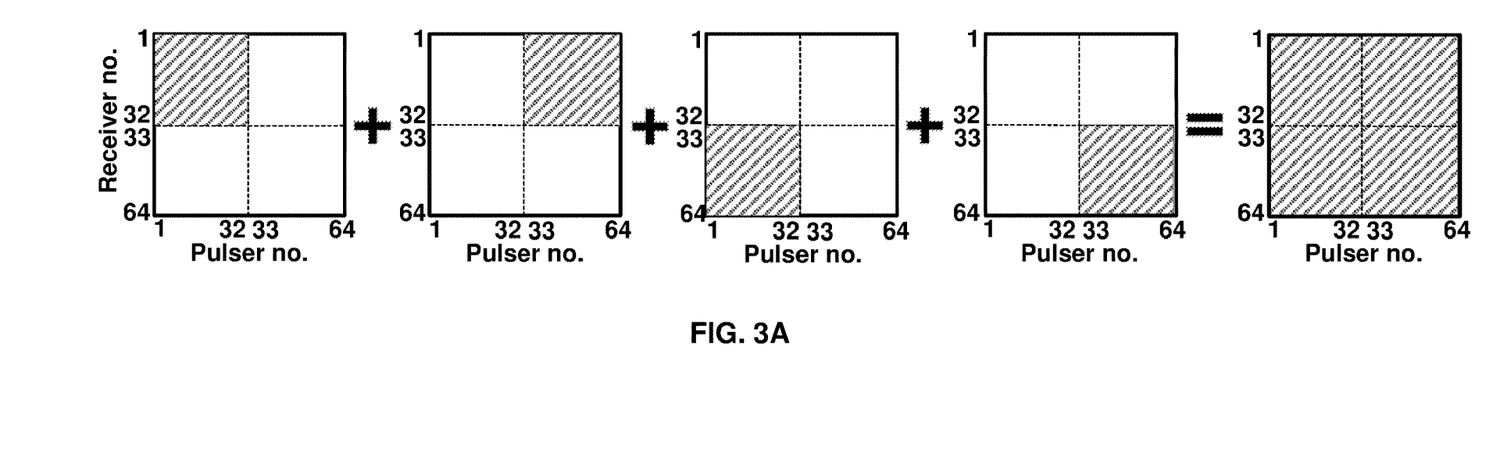
FIG. 3A is a schematic illustration of a FMC matrix acquisition method according to the present disclosure for generating an effective probe aperture larger than the instrument's active aperture size.

A further novel aspect of the present disclosure is that FMC may optionally and advantageously be used to produce TFM results equivalent to a probe aperture which is larger than the instrument's active aperture size. This is important because a larger probe aperture allows improved acoustic resolution. FIG. 3A shows an illustrative example of the production of a probe aperture larger than the instrument's active aperture. In this particular embodiment the probe has 64 elements, but the maximum active aperture size is 32 elements. Such restriction in the maximum active aperture size is common in PAUT instrumentation because each element in the active aperture requires costly analog to digital conversion and digital electronics. However, using FMC/TFM processing of the present disclosure, the effective aperture size may be increased to the full number of elements in the probe. This is done by acquiring the full FMC matrix of 64 pulsers and 64 receivers by acquiring and summing four partial matrices as shown in FIG. 3A. A first partial matrix uses pulsers 1 to 32 and receivers 1 to 32, a second partial matrix uses pulsers 33 to 64 and receivers 1 to 32, a third partial matrix uses pulsers 1 to 32 and receivers 33 to 64, and a fourth partial matrix uses pulsers 33 to 64 and receivers 33 to 64. The response A-scans from all 4 partial matrices are stored in a 64×64 FMC matrix and subsequent TFM processing takes advantage of the improved resolution of the full 64 element aperture. The improved resolution is achieved without addition of any expensive digital electronics.

Figure 3B:
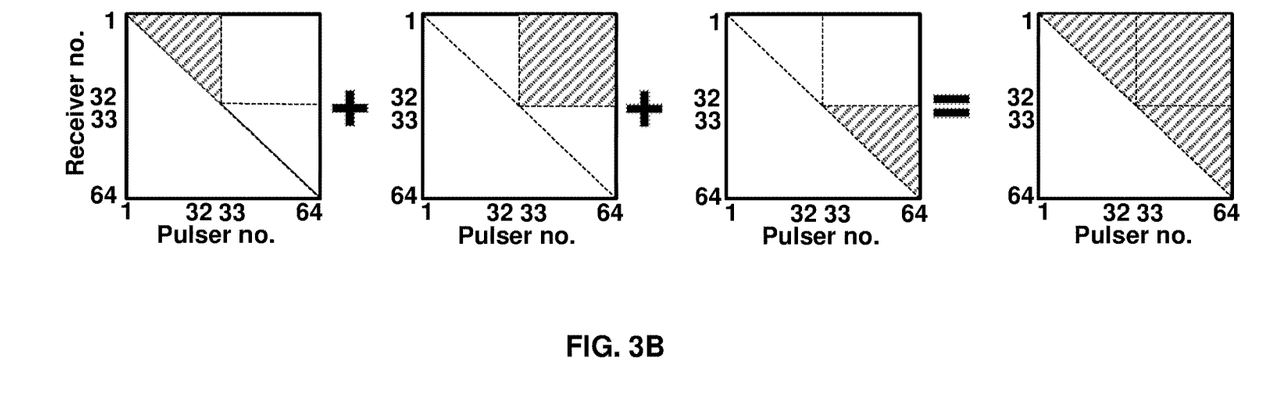
FIG. 3B is a schematic illustration of a half matrix capture acquisition method according to the present disclosure for generating an effective probe aperture larger than the instrument's active aperture size according to the present disclosure.

In FMC/TFM processing, various methods of reducing the computational and storage requirements are known to those skilled in the art. Examples of such methods include Half Matrix Capture (HMC) (see for example Hunter et. al., IEEE Transactions on Ultrasonics, Ferroelectronics and Frequency Control, Vol 55, No. 11, November 2008) and Sparse Matrix Processing (see for example Weston, Thesis Submitted to the University of Manchester, 2011 p 47-48 and p 114-136, also Moreau et al, IEEE Transactions on Ultrasound, Ferroelectronics and Frequency Control (2009), Vol 56, No. 9, 1932-1944, also Lockwood G. R. and Foster F. S. IEEE Transactions on Ultrasound, Ferroelectronics and Frequency Control (1996), Vol 43, No. 1, 15-19). Such methods may be used to reduce computational and storage requirements for the present disclosure, but use of these methods does not preclude achieving improved resolution by production of an effective probe aperture which is larger than the instrument's active aperture. FIG. 3B illustrates acquisition of a HMC matrix for the same probe instrument as in FIG. 3A, having 64 probe elements but a maximum aperture size of 32 elements. The complete 64 element half matrix is acquired by acquiring and summing 3 partial matrices, and by assuming that $A_{ij}=A_{ji}$ for i≠j to form a complete 64×64 matrix. A first partial matrix uses pulsers 1 to 32 and receivers 1 to 32 with only half the combinations as shown, a second partial matrix uses pulsers 33 to 64 and receivers 1 to 32, and a third partial matrix uses pulsers 33 to 64 and receivers 33 to 64 with only half the combinations as shown. The response A-scans from all three steps are stored in a 64×64 HMC matrix and subsequent TFM processing under the assumption that $A_{ij}=A_{ji}$, takes advantage of the improved resolution of the full 64 element aperture.

It should be noted that the numerical illustrations of FIGS. 3A and 3B are by way of example only. The illustrated methods of achieving a larger effective aperture may be used for any number of elements in the probe, and any number of elements in the maximum aperture, and all such combinations are within the scope of the present disclosure. Similarly, the illustrated methods of achieving a larger effective aperture may be used in conjunction with various schemes for reducing computational and storage requirements, and all such combinations are within the scope of the present disclosure.

Figure 4:
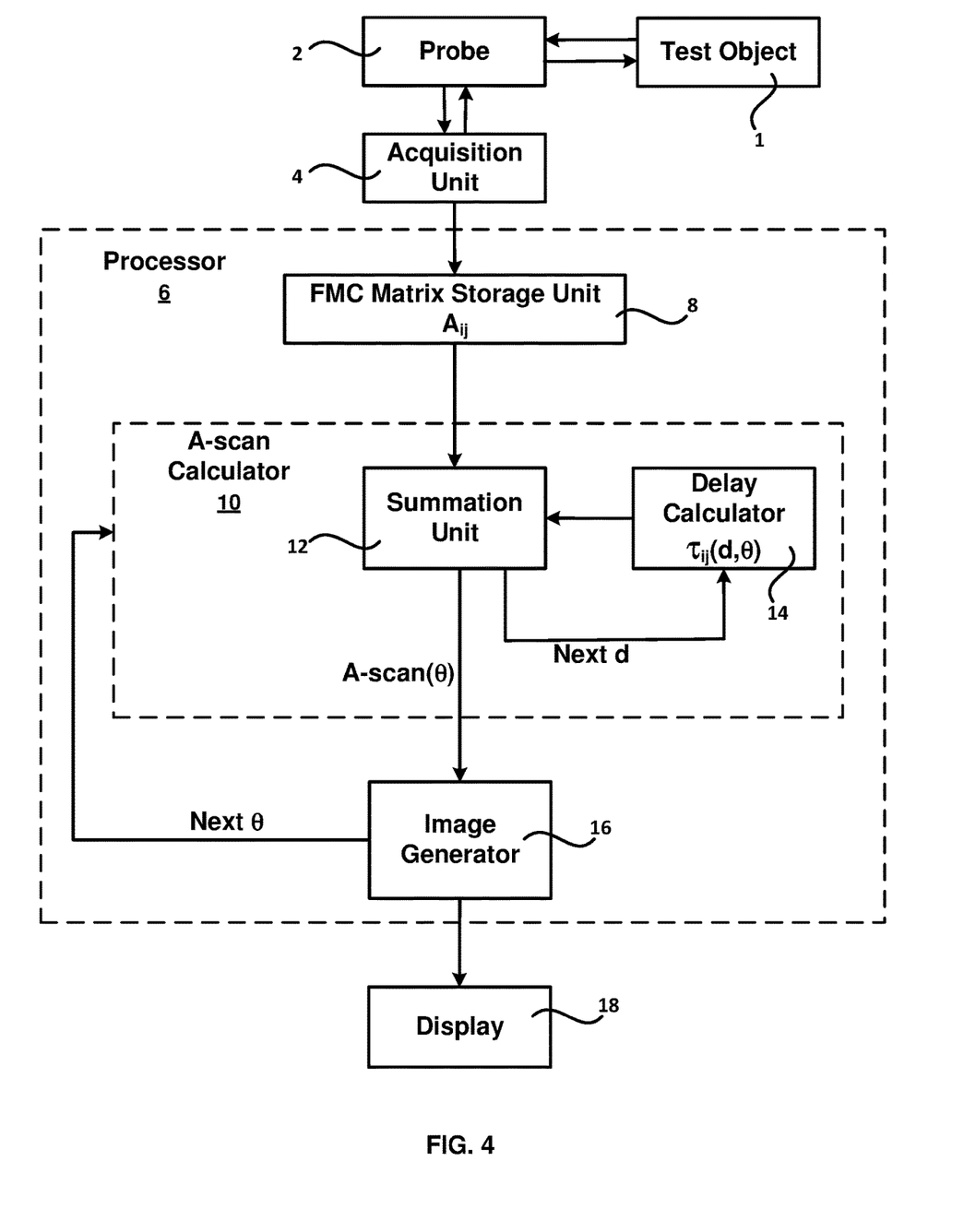
FIG. 4 is a schematic representation of an ultrasonic NDT apparatus using the improved TFM method using calculated angle beams according to the present disclosure.

FIG. 4 is a schematic representation of a TFM acquisition and analysis system according to the present disclosure. Ultrasonic array probe 2 is in acoustic contact with test object 1. Probe 2 is connected to an acquisition unit 4, which controls emission of ultrasonic energy from the elements of probe 2, and receives response A-scans of echo responses received by probe 2 from test object 1. Acquisition unit 4 acquires FMC data by sequentially pulsing each of N pulsers in probe 2, and for each pulse receiving response A-scans from each of M receivers in probe 2. The response A-scans are sent to an optional FMC matrix storage unit 8, which is a memory unit of a processor 6. When FMC acquisition is complete, FMC matrix storage unit 8 contains M×N response A-scans $A_{ij}$, where i=1 to N and j=1 to M.

In an alternative embodiment, in the absence of FMC matrix storage unit 8, response A-scans from the sequential pulsing of each of the N pulsers may be sent directly to an A-scan calculator 10 which sequentially processes the N response A-scans.

Processor 6 further comprises A-scan calculator 10 and an image generator 16. A-scan calculator 10 comprises a summation unit 12 and a delay calculator 14. When FMC acquisition is complete, summation unit 12 reads the data for response A-scans $A_{ij}$ from FMC matrix storage unit 8. Delay calculator 14 calculates delays $\tau_{ij}(d,\theta)$ according to the Fermat principle and summation unit 12 performs the summations of response A-scans $A_{ij}$ with the calculated delays, according to equation (1). Summations are performed over the required range of depth d, as in equations (2) and (3), and A-scan calculator 10 then outputs A-scan(θ), which is a single calculated A-scan corresponding to a line at angle θ. Image generator 16 receives A-scan(θ) and increments angle θ to form the image over the required range of angles. Finally, data for the image is sent to a display 18.

Figure 5:
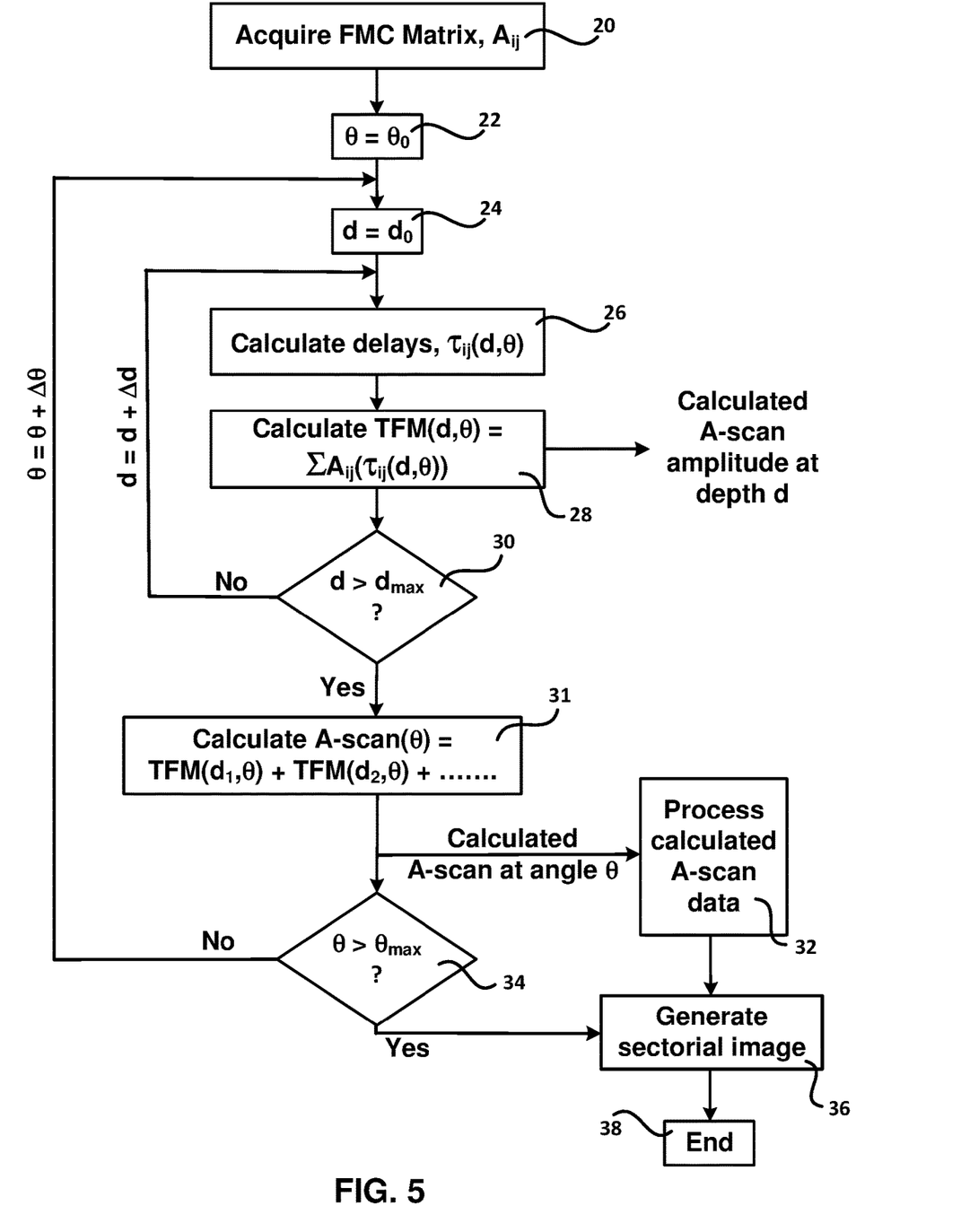
FIG. 5 is a schematic representation of a TFM analysis method according to the present disclosure.

FIG. 5 is a schematic representation of a TFM analysis method according to the present disclosure. In step 20 of the method, a FMC matrix $A_{ij}$ is acquired using one or more ultrasonic array probes having N transmitters and M receivers. In step 22 variable θ is set to a minimum angle $\theta_0$ for post-processing calculations, and in step 24 variable d is set to a minimum depth $d_0$ for post-processing calculations. Minimum values $\theta_0$ and $d_0$ are defined using the same rules as for conventional PAUT. In step 26, delays $\tau_{ij}$ are calculated for i=1 to N and j=1 to M, the calculation making use of the Fermat principle. In step 28 the calculation according to equation (1) is performed, so that the result of step 28 is a calculated A-scan beam forming amplitude at depth d. In step 30 the value of d is compared with a maximum value $d_{max}$. If d is not greater than $d_{max}$ then the value of d is incremented by an amount Δd, and the method returns to step 26 to calculate a calculated A-scan beam forming amplitude for the new value of d. If, at step 30, d is found to be greater than or equal to $d_{max}$ then in step 31 all calculated A-scan beam forming amplitudes are summed in accordance with equations (2) and (3). The result of calculations in step 31 is a calculated A-scan of a complete line at angle θ. In step 32, the calculated A-scan may optionally be further digitally processed, for example by using a high pass filter or other digital processing methods.

In step 34 the value of θ is compared with a maximum value $\theta_{max}$. If θ is not greater than $\theta_{max}$ then the value of θ is incremented by an amount Δθ, and the method returns to step 24 to compute a calculated A-scan for the new value of θ. If, at step 30, θ is found to be greater than or equal to $\theta_{max}$ then all the calculated A-scans, optionally processed at step 32, are used to generate a sectorial image. The process ends at step 38.

It should be noted that the apparatus of FIG. 4 and the method of FIG. 5 have been described with reference to the preferred embodiment of a PE mode of operation. However, the apparatus of FIG. 4 and the method of FIG. 5 are also applicable to other modes of operation, and all such applications to other modes are within the scope of the present disclosure.

Although the present invention has been described in relation to particular embodiments thereof, it can be appreciated that various designs can be conceived based on the teachings of the present disclosure, and all are within the scope of the present disclosure.

What is claimed is:

1. A matrix capture and total focusing method (TFM) ultrasound inspection system comprising:
   at least one ultrasonic array probe ultrasonically coupled to a test surface of a test object, the probe configured to transmit ultrasonic energy and to receive response energy from the test object;
   an acquisition unit causing sequential pulsing of N transmitters of the at least one probe and receiving response signals from M receivers of the at least one probe, the acquisition unit thereby acquiring a received matrix of response A-scans, $A_{ij}$, wherein each response A-scan is the received response signals as a function of time, the received response signals being corresponding to transmission from an $i^{th}$ transmitter and reception at a $j^{th}$ receiver; and,
   an A-scan calculator configured to process the response signals and to calculate a calculated A-scan for a plurality of focal points along a desired propagation line within the test object, the propagation line at an angle θ relative to a test surface normal, and the plurality focal points located on the propagation line at different depths below the test surface, the A-scan calculator comprising:
   a delay calculator configured to calculate focal point delay times $\tau_{ij}$ from the $i^{th}$ transmitter to the $j^{th}$ receiver via a focal point of the plurality focal points; and,
   a summation unit configured to calculate an A-scan beam forming amplitude at the focal point of the plurality focal points by making a summation of the response A-scans, wherein each response A-scan in the summation is delayed by the corresponding focal point delay time, the summation unit further configured to derive the calculated A-scan based on the A-scan beam forming amplitudes corresponding to each of the corresponding focal points along the propagation line; and,
   an image generator configured to generate and display an image based on the calculated A-scan.

2. The inspection system of claim 1 wherein the received matrix is a full matrix capture (FMC) matrix and wherein i=1 to N and j=1 to M.

3. The inspection system of claim 1 wherein the received matrix is a half matrix capture (HMC) matrix and wherein i=1 to N and j=1 to M.

4. The inspection system of claim 1 wherein the A-scan calculator is configured to perform post-processing of the response signals.

5. The inspection system of claim 1 wherein a calculated TFM sectorial scan is generated by calculating the calculated A-scan for each of a range of values of the angle θ, and wherein the image generator generates the image from the calculated TFM sectorial scan.

6. The inspection system of claim 5 wherein the calculated A-scans are digitally processed with a high pass filter prior to formation of the image.

7. The inspection system of claim 1 wherein a calculated TFM linear scan is generated by calculating the calculated A-scan at the angle θ for each of a range of values of a linear displacement of the propagation line in a direction parallel to the test surface, and wherein the image generator generates the image from the calculated TFM linear scan.

8. The inspection system of claim 2 wherein an effective aperture size is 2N×2M, wherein the received matrix of response A-scans, $A_{ij}$, is the sum of four partial matrices, each partial matrix having an aperture size of N×M.

9. The inspection system of claim 8 wherein the acquisition unit acquires a first partial matrix for i=1 to N and j=1 to M, a second partial matrix for i=1 to N and j=(M+1) to 2M, a third partial matrix for i=(N+1) to 2N and j=1 to M, and a fourth partial matrix for i=(N+1) to 2N and j=(M+1) to 2M.

10. The inspection system of claim 3 wherein an effective aperture size is 2N×2M, wherein the received matrix of response A-scans, $A_{ij}$, is the sum of three partial matrices, and wherein the effective aperture size is derived by setting $A_{ij}=A_{ji}$ for i≠j.

11. The inspection system of claim 10 wherein the acquisition unit acquires a first partial matrix for i=1 to N and j=1 to M, a second partial matrix for i=(N+1) to 2N and j=1 to M, and a third partial matrix for i=(N+1) to 2N and j=(M+1) to 2M.

12. The inspection system of claim 1 wherein N=M.

13. The inspection system of claim 12 wherein the at least one ultrasonic array probe is one ultrasonic array probe.

14. A method of acquiring and processing an ultrasonically received matrix $A_{ij}$ of response A-scans the method comprising the steps of:
   acquiring the received matrix of response A-scans with at least one ultrasonic array probe having N transmitters and M receivers, the probe ultrasonically coupled to a test surface of a test object, the N transmitters being sequentially pulsed and response signals being received at the M receivers, the received matrix comprising response A-scans, wherein each response A-scan is a received response signals as a function of time, the received response signals being due to transmission from an $i^{th}$ transmitter and reception at a $j^{th}$ receiver;
   calculating focal point delay times $\tau_{ij}$ from the $i^{th}$ transmitter to the $j^{th}$ receiver via a focal point, the focal point is among a plurality of focal points along a propagation line within the test object, the propagation line at an angle θ relative to a test surface normal, the different focal points located on the propagation line at different depths below the test surface;
   calculating an A-scan beam forming amplitude at the focal point by making summation of the response A-scans, wherein each response A-scan in the summation is delayed by the corresponding focal point delay time;
   deriving a calculated A-scan along the propagation line, the calculated A-scan being based on the A-scan beam forming amplitudes corresponding to each focal point along the propagation line; and, generating and displaying an image based on the calculated A-scan.

15. The method of claim 14 wherein the received matrix is a full matrix capture (FMC) matrix and wherein $i=1$ to N and $j=1$ to M.

16. The method of claim 14 wherein a calculated TFM sectorial scan is generated by deriving the calculated Ascan for each of a range of values of the angle $\theta$, and wherein the step of generating an image comprises generating an image from the calculated TFM sectorial scan.

17. The method of claim 14 wherein a calculated TFM linear scan is generated by deriving the calculated Ascan at the angle $\theta$ for each of a range of values of a linear displacement of the propagation line in a direction parallel to the test surface, and wherein the step of generating an image comprises generating an image from the calculated TFM linear scan.

18. The method of claim 15 wherein an effective aperture size is $2N \times 2M$, and wherein the step of acquiring the received matrix $A_{ij}$ comprises acquiring and summing four partial matrices, each partial matrix having an aperture size of $N \times M$.

19. The method of claim 18 wherein a first partial matrix is acquired for $i=1$ to N and $j=1$ to M, a second partial matrix is acquired for $i=1$ to N and $j=(M+1)$ to 2M, a third partial matrix is acquired for $i=(N+1)$ to 2N and $j=1$ to M, and a fourth partial matrix is acquired for $i=(N+1)$ to 2N and $j=(M+1)$ to 2M.

* * * * *

UNITED STATES PATENT AND TRADEMARK OFFICE
CERTIFICATE OF CORRECTION

Page 1 of 1

PATENT NO. : 11,029,289 B2
APPLICATION NO. : 15/849195
DATED : June 8, 2021
INVENTOR(S) : Habermehl et al.

It is certified that error appears in the above-identified patent and that said Letters Patent is hereby corrected as shown below:

On the Title Page

On page 2, in Column 1, under "Other Publications", Line 8, delete "Filed" and insert --Field-- therefor In the Claims In Column 7, Line 39, in Claim 1, delete "and," and insert --and-- therefor In Column 7, Line 50, in Claim 1, delete "and," and insert --and-- therefor In Column 9, Line 2, in Claim 14, delete "and," and insert --and-- therefor In Column 9, Line 9, in Claim 16, delete "Ascan" and insert --A-scan-- therefor In Column 9, Line 14, in Claim 17, delete "Ascan" and insert --A-scan-- therefor Signed and Sealed this
Fifth Day of October, 2021

Drew Hirshfeld
*Performing the Functions and Duties of the
Under Secretary of Commerce for Intellectual Property and
Director of the United States Patent and Trademark Office*